United States Patent
Rivard et al.

[11] Patent Number: 5,785,852
[45] Date of Patent: Jul. 28, 1998

[54] PRETREATMENT OF HIGH SOLID MICROBIAL SLUDGES

[75] Inventors: Christopher J. Rivard, Lakewood; Nicholas J. Nagle, Broomfield, both of Colo.

[73] Assignee: Midwest Research Institute, Kansas City, Mich.

[21] Appl. No.: 418,592

[22] Filed: Apr. 6, 1995

[51] Int. Cl.⁶ .................................................. C02F 11/18
[52] U.S. Cl. ...................... 210/613; 210/631; 210/750; 210/761
[58] Field of Search ........................ 210/761, 603, 210/605, 613, 630, 631, 750, 766, 774

[56] References Cited

U.S. PATENT DOCUMENTS

| | | | |
|---|---|---|---|
| H1149 | 3/1993 | Wyman et al. | |
| 3,264,213 | 8/1966 | Pav et al. | 210/6 |
| 3,920,548 | 11/1975 | Fassell et al. | 210/761 |
| 4,767,543 | 8/1988 | Chornet et al. | 210/761 |
| 4,861,519 | 8/1989 | Tusa et al. | 210/630 |
| 4,944,886 | 7/1990 | Masri | 210/748 |
| 4,985,149 | 1/1991 | Ohshima et al. | 210/603 |
| 4,988,442 | 1/1991 | Highsmith et al. | 210/609 |
| 5,053,142 | 10/1991 | Sorensen et al. | 210/761 |
| 5,087,378 | 2/1992 | Kovacs | 210/742 |
| 5,188,740 | 2/1993 | Khan | 210/770 |
| 5,188,741 | 2/1993 | Zang et al. | 210/774 |
| 5,234,468 | 8/1993 | Khan | 210/758 |
| 5,234,469 | 8/1993 | Khan et al. | 210/758 |
| 5,266,085 | 11/1993 | McMahon et al. | 210/758 |
| 5,292,442 | 3/1994 | Khan et al. | 210/770 |
| 5,380,455 | 1/1995 | Rivard et al. | 210/748 |

OTHER PUBLICATIONS

N.J. Nagle, et al. "Efficacy of Hydrolytic Enzyme Augmentation and Thermochemical Pretreatments for Increased Secondary anaerobic Digestion of Treated Municipal Sewage Sludges," *Applied Biochemistry and Biotechnology*, vol. 34/35, 1992.

*Primary Examiner*—Thomas G. Wyse
*Attorney, Agent, or Firm*—Edna M. O'Connor

[57] ABSTRACT

A process and apparatus for pretreating microbial sludges in order to enhance secondary anaerobic digestion. The pretreatment process involves disrupting the cellular integrity of municipal sewage sludge through a combination of thermal, explosive decompression and shear forces. The sludge is pressurized and pumped to a pretreatment reactor where it is mixed with steam to heat and soften the sludge. The pressure of the sludge is suddenly reduced and explosive decompression forces are imparted which partially disrupt the cellular integrity of the sludge. Shear forces are then applied to the sludge to further disrupt the cellular integrity of the sludge. Disrupting cellular integrity releases both soluble and insoluble organic constituents and thereby renders municipal sewage sludge more amenable to secondary anaerobic digestion.

18 Claims, 1 Drawing Sheet

5,785,852

PRETREATMENT OF HIGH SOLID MICROBIAL SLUDGES

CONTRACTUAL ORIGIN OF THE INVENTION

The United States Government has rights in this invention under Contract No. DE-AC36-83CH10093 between the United States Department of Energy and the National Renewable Energy Laboratory, a Division of the Midwest Research Institute.

BACKGROUND OF THE INVENTION

1. Field of the Invention

The instant invention relates to the pretreatment of microbial sludges, particularly those with a high solid content. The pretreatment process is intended to disrupt the cellular integrity of municipal microbial sewage sludges thereby rendering them more amenable to secondary anaerobic digestion. In order to effectively disrupt the cellular integrity of the sludge, a multi-stage process involving heating, explosive decompression and shearing is preferred.

2. Description of the Prior Art

Modern municipal sewage waste treatment plants utilize conventional mechanical and biological processes to reclaim wastewaters. The conventional method converts a water pollution problem into a solid waste disposal problem. The disposal of microbial sludge solids resulting from conventional municipal sewage treatment has historically been expensive because of the extremely large volumes of sludge produced. These sludges contain high fractions of volatile solids (VS), and they retain large amounts of water (70–85% before drying). The substantial bulk of the waste presents significant disposal costs. The decreased availability of landfills has brought about a cost increase for the disposal of microbial sludges. In some areas, microbial sludges are banned altogether from land fills because of the high pollution potential and the presence of active microbial catalysts.

One solution to the problem of municipal sewage sludge disposal is to further reduce the organic content of the waste. This increases the potential for dewatering, (reduction in bulk), and further reduces both the pollution potential and pathogen load of the waste. The instant invention is directed toward pretreatment of the microbial sludges to make them more amenable to secondary anaerobic digestion. Following the preferred treatment involving secondary anaerobic digestion, the reduced organic content of the sewage sludge allows for efficient dewatering and reduces the biological activity and odor production of the sludge during final disposal. Pretreatment also serves to destroy potentially pathogenic microorganisms that may be present in sewage sludge and reduces shipping and final disposal costs of the waste through reduction of the sludge bulk.

Treatment of high solids microbial sludge presents more difficulties than that required for the treatment of low solids microbial sludge. The particular problem associated with high solids sludge is the increased viscosity of the sludge which prevents the use of conventional equipment for pumping and stirring the sludge. Low solids microbial sludge, on the other hand, may be easily pumped, metered, and stirred. Applicants' pretreatment process serves to increase the fluidity of the sludge through a combination of thermal treatment, explosive decompression and shear forces. While applicants' pretreatment process is applicable to the treatment of both low and high solids sludge, the process is economically more feasible when run with high solids sludges. Treating high solids sludges is more energy and cost efficient by virtue of achieving greater sludge solids per energy input ratios as compared to treating low solids sludges which contain more water per volume.

The treatment of high solids microbial sludges has been dealt with in U.S. Pat. No. 5,292,442 to Khan et al. The Khan patent describes a process for disposing of sanitary sewage sludge by producing a pumpable slurry of sewage sludge and burning the slurry as fuel. The Khan patent is specifically directed to a process whereby the slurry of sewage sludge is subjected to a three stage heating process. The sludge is then dewatered by flash evaporation or centrifuging, and burned to produce synthesis gas or a hot raw effluent gas stream. The Khan patent, however, does not suggest a pretreatment process that disrupts the cellular integrity of microbial sewage sludge. Furthermore, the Khan patent does not teach the use of thermal heat, explosive decompression and shear forces to disrupt the sludge integrity, for the purpose of enhancing secondary anaerobic digestion.

Additionally, it is unlikely that the Khan patent would result in treated sludge that would be appropriate for further biological digestion. The extensive thermal treatment described in the Khan patent could potentially produce compounds that are toxic to microbial cells and, therefore, preclude any further biological digestion. In addition, extensive thermal treatments are largely ineffective in disrupting sludge microbial cells. Applicants' process however, is directed toward the use of a short duration, high temperature, high pressure pretreatment, that would disrupt the sludge cellular integrity thereby releasing soluble organics while minimizing the production of toxic compounds. The process thus allows further biological digestion.

The benefits of pretreating sludges for subsequent anaerobic digestion are set forth in the article "Efficacy of Hydrolytic Enzyme Augmentation and Thermochemical Pretreatments for Increased Secondary Anaerobic Digestion of Treated Municipal Sewage Sludges", Nagle et al. Applied Biochemistry and Biotechnology, Vol. 34/35, p. 737 (1992). Thermal, chemical, or enzymatic pretreatments are proposed in the article. There is no disclosure however, of the combination of thermal treatment with both explosive decompression and shear forces to disrupt cellular integrity.

U.S. Pat. No. 5,380,445 to the same inventors as the present application discloses subjecting the sludge to shear or sonication, or some combination thereof. The patent is specific for sludges of less than 3% solids, (3 wt %). Furthermore, the patent does not disclose the unique combination of thermal treatment, explosive decompression, and shear to successfully pretreat sludges of higher solid content.

SUMMARY OF THE INVENTION

It is an object of the instant invention to pretreat microbial sludges to enhance secondary anaerobic digestion.

It is a further object of the instant invention to disrupt the cellular integrity of municipal sewage sludges in order to release both soluble and insoluble organic constituents and thereby render the sludge more amenable to secondary anaerobic digestion.

It is an additional object of the invention to combine thermal, explosive decompression and shear forces for effective disruption of cellular integrity.

The invention is directed to a process for pretreatment of microbial sludges including sludges with high solid content, in order to enhance secondary anaerobic digestion. The pretreatment process involves disrupting the cellular integrity of municipal sewage sludge through the combination of thermal, explosive decompression, and shear forces. The process of the invention uses a short duration, high temperature and high pressure thermal treatment combined with explosive decompression and shear forces. The process releases both soluble and insoluble organic constituents thus rendering municipal sewage sludge more amenable to secondary anaerobic digestion.

DESCRIPTION OF THE PREFERRED EMBODIMENT

Figure 1:
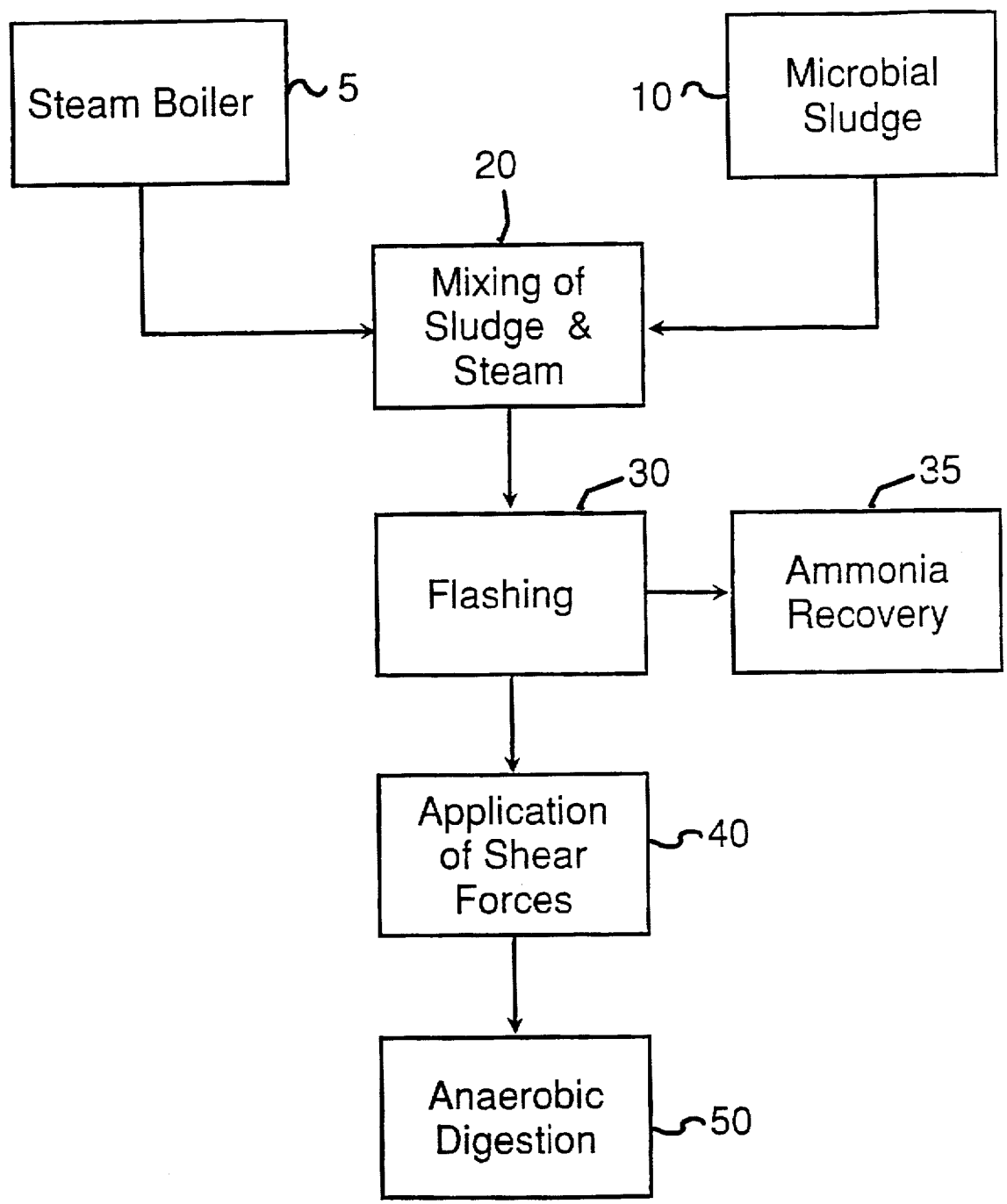
FIG. 1 shows a box diagram depicting the pretreatment process for high solids microbial sludges.

Applicants' pretreatment process, as shown in FIG. 1, is most economical utilizing municipal sewage sludge as dewatered by conventional centrifugation, having a total solids content greater than 10% although the sludge can be in the range of 10%–35% total solids. Generally sludges having a total solid content greater than 10% (10 wt %) are considered to be high solid or high solid content sludges. It is understood, however, that the process could also be used to pretreat sludges having a lower solid content of less than 10% total solids.

Following dewatering, the sludge indicated at 10 is pumped to a pretreatment reactor where it is mixed and saturated at 20 with steam from a steam boiler 5. Due to the increased viscosity of high solids sludges, the sludge is preferably pumped by means of a progressing cavity pump, piston pump, large bellows pump or extruder, although other equipment could also be used. Pumping the sludge to the pretreatment reactor increases the pressure of the sludge preferably from 200–300 psi, although increasing the pressure to 100–600 psi would also be satisfactory. The optimal pressure achieved, however, depends upon the type and solids level of the microbial sludge to be treated and, therefore, pumping adjustments may be necessary depending on the composition of the sludge. The pressure range will correspondingly vary with the pumping adjustments.

In the pretreatment reactor, the sludge is mixed and saturated with steam. The direct steam contact heats the sludge to a temperature in the range of 250° F.–350° F., although temperatures in the range from 180° F.–385° F. can also be achieved and are satisfactory. The blending of the sludge and steam in the pretreatment reactor softens the sludge and renders the microbial cells more susceptible to disruption. Additionally, the high temperature in the pretreatment reactor sanitizes the sludge by destroying potentially pathogenic microorganisms. A hydroheater is the preferred pretreatment reactor for mixing the high pressure sludge with steam, but a masonite gun reactor, french press or other conventional equipment may also be used to blend the sludge and steam. The hydroheater is advantageous because it is capable of regulating the steam to sludge ratio and can provide optimal mixing of the steam and sludge. The hydroheater is particularly advantageous for industrial applications because it provides for continuous processing rather than intermittent batch processing. Treatment times in the hydroheater may range from less than 1 second to 5 seconds preferably, although a longer period of time could also be satisfactory. Treatment for over 1 minute would generally not be necessary. The use of the hydroheater therefore contributes to the overall short duration for processing.

The sludge, now at increased pressure and temperature, exits the pretreatment reactor and enters a flash tank where it is flashed at 30 to atmospheric pressure. The sudden reduction in pressure imparts explosive decompression forces which disrupt approximately 20%–40% of the microbial cells present in the sludge. Explosive decompression also releases trapped steam from the sludge and the steam may be removed from the primary flash tank to a secondary flash tank. The steam can then be condensed in the secondary flash tank to recover any ammonia as indicated at 35. In addition, the explosive decompression process increases the fluidity of the sludge prior to further treatment.

The partially disrupted and pressure reduced sludge is next subjected to shear forces, as shown at 40, to further disrupt the cellular integrity and increase the sludge fluidity. A well known basket mill or cage mill is the preferred apparatus for applying shear forces to the sludge, although it is understood that other well known apparatus could be used. Processing time in the mill ranges preferably from 5 seconds to 4 minutes, and for periods over 10 minutes the shear forces loose effectiveness. Shear treatment disrupts up to 65% of the microbial cells present in the sludge following the explosive decompression. Therefore, the entire pretreatment process is capable of disrupting approximately 40%–85% of the microbial cells present in municipal sewage sludge.

After pretreatment the sludge is pumped to a reactor for subsequent anaerobic digestion at 50. Any well known reactor can be used although a horizontal shaft, hydraulically driven reactor is preferred. A single charge, (batch), non-mixed reactor can also be utilized for the anaerobic digestion.

Pretreatment effectiveness is evaluated based upon the release of soluble chemical oxygen demand (COD) from a pretreated sludge sample which is directly proportional to the level of cell disruption. Increases in soluble COD are directly related to an increase in the anaerobic digestion potential of the sample. Applicants' pretreatment process for disrupting the cellular integrity of sludge through the combination of thermal, explosive decompression and shear forces, results in a soluble COD increase of 40%–85%. Therefore, applicants' pretreatment process increases the anaerobic digestion potential of municipal sewage sludge by 40%–85%.

Several advantages are realized by virtue of the applicants' pretreatment process, including sterilization of the sludge and enhanced anaerobic digestion of the organic fraction of the sludge. Additionally, ammonia can be collected as a potential byproduct of the process.

EXAMPLE

Municipal sewage sludge was obtained from the Denver Metropolitan Wastewater Reclamation Plant. Sewage sludge samples were collected from the belt conveyor immediately following the continuous centrifugation system and were transferred to 40 gallon plastic drums. The sludge was stored at 4° C. in a cold room prior to use in order to reduce non-experiment related breakdown of the material. Sludge analysis reveals a total solids content of slightly greater than 17%, total chemical oxygen demand (COD) of 187.5 mg/g wet wt, and soluble COD of 9.2 mg/g wet wt.

TABLE 1

Analysis of Municipal Sewage Sludge Obtained from the Denver Metropolitan Reclamation District Before Pretreatment

| Parameter | Value |
| --- | --- |
| Total Solids (TS) | 17.3% ± 0.1 |
| Volatile Solids (VS, of dry weight) | 66.5% ± 0.2 |
| Ash (of dry weight) | 33.5% ± 0.2 |
| Total Chemical Oxygen Demand (COD, mg/g wet wt) | 187.5 ± 16.3 |
| Soluble COD (mg/g wet wt) | 9.2 ± 0.8 |
| pH | 8.01 |

The sludge from the plant was then pumped to a hydroheater (series M103MSX by Hydro Thermal) using a progressing cavity pump (model 9JKS3, Robbins Myers, Inc.) which allowed for operation at pressures up to 500 psi. The system had the capacity for treating 0.1–5.0 gallons per minute of high solids sludge. A high pressure boiler system was used to provide steam, having a temperature of approximately 410° F., to the hydroheater. The sludge was mixed with the steam for thermal treatment. The mixing increased the sludge temperature to 285° F. and the pressure was increased to 200 psi.

The sludge was then flashed to atmospheric pressure in a 40 gallon stainless steel tank. Following thermal treatment, the sludge was subjected to shear treatment using an Ultra Turrax (model T-45-S4) for 4 minutes at 50% power. Samples were then obtained for analysis of soluble COD.

Pretreatment effectiveness was evaluated based upon the release of soluble COD from the sewage sludge sample. Soluble COD was measured by diluting 1 gram of sample with 9 mL of distilled water and mixing vigorously. The diluted sample was placed into a 15 mL plastic centrifuge tube and centrifuged at 1000 rpm for 5 minutes at room temperature. A 100 µL sample of the upper phase supernatant was added to COD test vials. The COD assay was incubated for 2 hours at 150° C. and read at 600 nm using a spectrophotometer. The pretreatment process resulted in the release of 40%–66% of soluble COD from the high solid sewage sludge sample.

TABLE 2

Analysis of Municipal Sewage Sludge Obtained from the Denver Metropolitan Reclamation District After Pretreatment

| Parameter | Value |
| --- | --- |
| Total Solids (TS) | 16.3% ± 0.3 |
| Volatile Solids (VS, of dry weight) | 66.8% ± 3.1 |
| Ash (of dry weight) | 33.2% ± 3.1 |
| Total Chemical Oxygen Demand (COD, mg/g wet wt) | 176.7 ± 13.1 |
| Soluble COD (mg/g wet wt) | 114.8 ± 12.6 |
| pH | 7.90 |

While the invention has been described in detail and in terms of specific embodiments thereof, it will be apparent that various changes and modifications can be made therein by one skilled in the art without departing from the spirit and scope thereof.

What is claimed is:

1. A process for pretreating microbial sludge in order to disrupt cellular integrity of the sludge and enhance secondary anaerobic digestion, comprising:

a) pressurizing and pumping the sludge to be pretreated to a pretreatment reactor;

b) providing steam to the pretreatment reactor;

c) mixing the steam and sludge in the pretreatment reactor to heat the sludge;

d) flashing the sludge to decrease the pressure;

e) applying shear forces to the sludge wherein the cellular integrity of the sludge is disrupted.

2. A process as claimed in claim 1 wherein the flashing of the sludge occurs after the mixing of the steam and sludge in the pretreatment reactor.

3. A process as claimed in claim 1 wherein the applying shear forces occurs after the flashing of the sludge.

4. A process as claimed in claim 1 comprising dewatering the sludge to greater than 10% total solids prior to pressurizing and pumping the sludge to the pretreatment reactor.

5. A process as claimed in claim 1 wherein the step of pressurizing and pumping comprises pressurizing the sludge to a pressure in the range of 100–600 psi.

6. A process as claimed in claim 5 wherein the step of pressurizing and pumping comprises pressurizing the sludge to a pressure of 200–300 psi.

7. A process as claimed in claim 1 wherein the step of mixing the steam and sludge comprises heating the sludge to a temperature in the range of 180° F.–385° F.

8. A process as claimed in claim 7 wherein the step of mixing the steam and sludge comprises heating the sludge to a temperature of 250° F.–350° F.

9. A process as claimed in claim 1 wherein the sludge to be pretreated has a total solid content of at least 10%.

10. A process as claimed in claim 1 wherein the step of mixing softens the sludge.

11. A process as claimed in claim 1 wherein the pretreatment reactor is a hydroheater.

12. A process as claimed in claim 1 further comprising releasing steam from the sludge during the flashing.

13. A process as claimed in claim 12 further comprising condensing the released steam to any recover ammonia contained therein.

14. The process of claim 1 wherein the step of flashing lowers the pressure of the sludge to atmospheric pressure.

15. The process of claim 1 wherein disruption of the cellular integrity of the sludge releases soluble and insoluble organic constituents of the sludge.

16. The process of claim 1 wherein the flashing imparts explosive decompression forces.

17. A process for treating microbial sludge, comprising:

a) pressurizing and pumping sludge to a pretreatment reactor;

b) providing steam to the pretreatment reactor;

c) mixing the steam and sludge in the pretreatment reactor to heat and soften the sludge;

d) flashing the mixed sludge to lower pressure;

e) applying shear forces to the flashed sludge;

f) treating the sludge after the application of shear forces to secondary anaerobic digestion.

18. The process of claim 17 wherein the sludge has a total solid content of at least 10%.

* * * * *